June 28, 1966   F. G. LOGAN   3,258,673
SYSTEM FOR CONVERTING SINGLE PHASE A.C. INTO D.C.
Filed Sept. 12, 1961
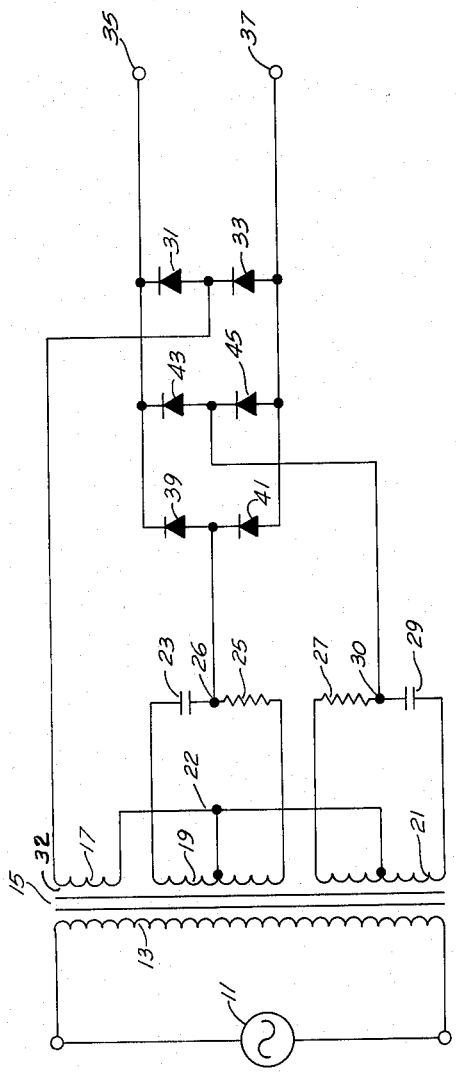
FRANK G. LOGAN
INVENTOR.
BY Sal A. Giarratana
George B. Oujevolk
ATTORNEYS

United States Patent Office 3,258,673
Patented June 28, 1966

3,258,673
SYSTEM FOR CONVERTING SINGLE PHASE A.C. INTO D.C.
Frank G. Logan, Ridgewood, N.J., assignor to General Precision Inc., Little Falls, N.J., a corporation of Delaware
Filed Sept. 12, 1961, Ser. No. 137,629
1 Claim. (Cl. 321—5)

This invention relates to detectors and more particularly to a detector which provides a D.C. voltage from a single phase A.C. source.

The performance of electronic circuits such as a transistor amplifier, which have a high linearity and a high sensitivity when driven by a pure D.C. voltage such as a battery, is seriously degraded when the circuits are driven by a D.C. voltage obtained by rectifying the output from a single phase A.C. source. The degradation results because of the ripple inherent in D.C. obtained from rectifying single phase A.C. When enough filtering is used to reduce the ripple in the D.C. sufficiently to obtain performance approximating that obtained when a pure D.C. voltage is used, a time constant is introduced into the electronic circuit having a magnitude which makes the circuit useless for many applications.

The present invention overcomes the above discussed problem by generating from the A.C. voltage D.C. voltage in which the ripple is substantially reduced without filtering. This result is achieved by converting voltage from the single phase A.C. source into polyphase voltage, full wave rectifying each of the phases in the polyphase voltage and combining the rectified outputs into a single output to provide the desired D.C. voltage. Because each of the rectified outputs is from a different phase, the ripple in the resulting D.C. voltage is greatly reduced and this reduction is achieved without filtering. When the A.C. voltage is converted to a three-phase voltage as in the preferred embodiment of the present invention, the amount of ripple is low enough so that the D.C. voltage may be used in many applications without filtering and in other applications in which filtering is required, the filter is small and would introduce almost a negligible time constant into a circuit driven by the D.C. voltage.

Accordingly, it is a principal object of the present invention to provide an improved system of producing D.C. voltage from an A.C. voltage.

Another object of this invention is to reduce the ripple in the D.C. voltage obtained from an A.C. voltage without filtering.

A further object of this invention is to provide from an A.C. voltage a D.C. voltage which has very little ripple and yet which will not increase the time constant of a circuit driven by the D.C. voltage.

Other objects and advantages of the present invention will become readily apparent as the following detailed description of the invention unfolds and when taken in conjunction with the single figure of the drawings which is a circuit diagram of the specific embodiment of the invention.

As shown in the drawings, a source 11 of single phase A.C. voltage is connected across the primary winding 13 of the transformer 15. The transformer 15 has three secondary windings 17, 19, and 21. The secondary windings 19 and 21 are each provided with center taps which are connected together and to one of the end terminals of the secondary winding 17 by connection 22. A capacitor 23 and a resistor 25 are connected in series across the secondary winding 19. The junction between the capacitor 23 and resistor 25 is designated by the reference number 26. A resistor 27 and a capacitor 29 are connected in series across the secondary winding 21.

The junction between the resistor 27 and the capacitor 29 is designated by the reference number 30. Because of the reactance of the capacitors 23 and 29, the phases of the voltage generated between the junction 26 and the common connection 22 of the secondary windings 17, 19 and 21 and between the junction 30 and the common connection 22 are shifted in phase relative to the phase of the source 11. The A.C. voltage generated in the secondary winding 17 will be substantially in phase with the phase of the source 11. As a result, the voltages generated between the junction 26 and the common connection 22 and between the junction 30 and the common connection 22 will be shifted relative to the phase of the voltage generated in the secondary winding 17. The size of the capacitor 23 relative to the resistor 25 is selected so that the voltage from the junction 26 to the common connection 22 leads the voltage generated in the secondary winding 17 by 120°. The size of the capacitor 29 relative to the resistor 27 is selected so that the voltage between the junction 30 and the common connection 22 lags the voltage generated in the secondary winding 17 by 120°. Thus a three phase voltage is produced from the single phase source 11.

The end terminal 32 of the secondary winding 17 which is not connected to the common connection 22 is connected to the anode of a rectifier 31 and to the cathode of a rectifier 33. The cathode of the rectifier 31 is connected to an output terminal 35 and the anode of the rectifier 33 is connected to an output terminal 37. The junction 26 between the capacitor 23 and the resistor 25 is connected to the anode of a rectifier 39 and to the cathode of a rectifier 41. The cathode of the rectifier 39 is connected to the output terminal 35 and the anode of the rectifier 41 is connected to the output terminal 37. The junction 30 between the resistor 27 and the capacitor 29 is connected to the anode of a rectifier 43 and to the cathode of a rectifier 45. The cathode of the rectifier 43 is connected to the output terminal 35 and the anode of the rectifier 45 is connected to the output terminal 37. The rectifiers 31, 33, 39, 41, 43 and 45 serve to rectify the three phase A.C. voltage produced by the phase shifting networks comprising the capacitors 23 and 29 and the resistors 25 and 27 and by the secondary winding 17, and combine the rectified outputs into a single D.C. output voltage across the output terminals 35 and 37. The plus side of the D.C. output voltage thus provided will be at terminal 35 and the minus side of the D.C. voltage provided will be at terminal 37. Because this D.C. output voltage across terminals 35 and 37 is obtained by the full wave rectifying of three phases 120° apart, the ripple in the D.C. voltage produced across terminals 35 and 37 will only be 4.5% of the voltage. The complete circuit for current flowing between the load connected across terminals 35 and 37 and the secondary winding 17 through the rectifiers 31 and 33 is provided by the rectifiers 39, 41, 43, and 45 and the common connection 22. Similarly, the complete circuit for current flowing between the load and the junction 26 through the rectifiers 39 and 41 is provided by the rectifiers 31, 33, 43 and 45 and the common connection 22 and the complete circuit for current flowing between the junction 30 and the load through the rectifiers 43 and 45 is provided by the rectifiers 31, 33, 39 and 41 and the common connection 22.

The ripple in the output voltage may be further reduced by increasing the number of phases to which the voltage from which the A.C. source is converted. To achieve maximum reduction of ripple, the phases must be equally spaced. This phase spacing must be real rather than apparent as is the case with two voltages 180° out of phase. For example, it will be recognized that the same ripple reduction may be achieved by a three phase voltage, the second phase of which lags the first by 60° and the third of which leads the first by 60°. The real spacing between these voltages is the same as that achieved with the circuit shown in the drawings since the exact same polyphase output is obtained if the above-mentioned second and third phases are reversed 180°. It is the real spacing that is referred to when it is stated that the phases are equally spaced. The phase shift circuits comprising the capacitors 23 and 29 and the resistors 25 and 27 may make use of inductors in addition to or instead of the capacitors 23 and 29 to provide the necessary reactance to achieve a phase shift. Many modifications may be made to the above described specific embodiment of the invention without departing from the spirit and scope thereof.

What is claimed is:

An A.C. to D.C. voltage converter circuit comprising:
a transformer having a primary winding and, inductively coupled thereto, a plurality of secondary windings each except one having a center-tap;
a polyphase rectifier network including a plurality of parallel branches, one for each of said secondary windings, each of said branches containing a pair of serially-connected, unidirectionally-oriented rectifying elements;
means electrically connecting one end of said one secondary winding to the center-taps of the other secondary windings and connecting the other end of said one secondary winding to a point between the rectifying elements of one of the parallel branches of said polyphase rectifier network;
a respective phase shift network for each of said other secondary windings consisting of a resistance and a capacitance element connected in series between the ends of the respective secondary windings so as to establish uniform phase differences between the outputs of said secondary windings; and
means electrically connecting a point intermediate the resistance and capacitance elements of each said phase shift network to a point intermediate the rectifying elements of a respective one of the other parallel branches of said polyphase rectifier network.

References Cited by the Examiner

UNITED STATES PATENTS

| | | | |
|---|---|---|---|
| 2,634,392 | 4/1953 | Pohm | 321—5 |
| 2,997,236 | 8/1961 | Hammer | 323—120 |
| 3,005,944 | 10/1961 | Hill | 321—5 |
| 3,045,169 | 7/1962 | Barber | 321—5 X |

FOREIGN PATENTS 1,073,619    1/1960    Germany.

JOHN F. COUCH, *Primary Examiner.*

ROBERT C. SIMS, LLOYD McCOLLUM, *Examiners.*

J. C. SQUILLARO, W. H. BEHA, *Assistant Examiners.*